(12) United States Patent
Xiang et al.

(10) Patent No.: US 10,938,257 B2
(45) Date of Patent: Mar. 2, 2021

(54) STATOR FOR MOTOR, MOTOR AND COMPRESSOR

(71) Applicant: GUANGDONG MEIZHI PRECISION-MANUFACTURING CO., LTD., Guangdong (CN)

(72) Inventors: Dong Xiang, Guangdong (CN); Qingxuan Fu, Guangdong (CN); Jun Liu, Guangdong (CN); Xiuxiu Qi, Guangdong (CN); Youbin Luo, Guangdong (CN)

(73) Assignee: GUANGDONG MEIZHI PRECISION-MANUFACTURING CO., LTD., Guangdong (CN)

( * ) Notice: Subject to any disclaimer, the term of this patent is extended or adjusted under 35 U.S.C. 154(b) by 22 days.

(21) Appl. No.: 16/345,904

(22) PCT Filed: Aug. 28, 2017

(86) PCT No.: PCT/CN2017/099341
§ 371 (c)(1),
(2) Date: Apr. 29, 2019

(87) PCT Pub. No.: WO2018/076921
PCT Pub. Date: May 3, 2018

(65) Prior Publication Data
US 2019/0319501 A1    Oct. 17, 2019

(30) Foreign Application Priority Data

Oct. 31, 2016 (CN) .......................... 201610939675.1

(51) Int. Cl.
*H02K 3/02* (2006.01)
*H02K 1/16* (2006.01)
(Continued)

(52) U.S. Cl.
CPC ............... *H02K 1/165* (2013.01); *F25B 1/00* (2013.01); *H02K 3/02* (2013.01); *H02K 3/50* (2013.01);
(Continued)

(58) Field of Classification Search
CPC .......................... H02K 1/165; H02K 2213/03
See application file for complete search history.

(56) References Cited

U.S. PATENT DOCUMENTS 4,542,064 A * 9/1985 Chabata ................. C09J 163/00
428/383
7,709,992 B2    5/2010 Hussey et al.
(Continued)

FOREIGN PATENT DOCUMENTS

CN    101625913 A    1/2010
CN    201758309 U    3/2011
(Continued)

OTHER PUBLICATIONS

Extended European Search Report dated Sep. 3, 2019 received in European Patent Application 17864415.9.
(Continued)

*Primary Examiner* — Dang D Le
(74) *Attorney, Agent, or Firm* — Scully Scott Murphy & Presser

(57) ABSTRACT

Provided are a stator, a motor and a compressor for a motor. The stator (100) includes: a substantially annular stator body (1). The stator body (1) is formed by stacking a plurality of silicon steel sheets. The magnetic induction intensity of the silicon steel sheets is B, B>1.79 T. A plurality of stator teeth (2) arranged at intervals are formed on an inner peripheral wall of the stator body (1), and an accommodating groove (3) is defined between two adjacent stator teeth (2). A diameter of a circle where inner end surfaces of the plurality
(Continued)

of stator teeth (2) are located is D1 and a diameter of a circle where an outer end of the stator body (1) is located is D2, and D1 and D2 satisfy: D1/D2>0.515.

8 Claims, 3 Drawing Sheets

(51) Int. Cl.
  *F25B 1/00* (2006.01)
  *H02K 3/50* (2006.01)
(52) U.S. Cl.
  CPC ..... *H02K 2203/09* (2013.01); *H02K 2213/03* (2013.01)

(56) References Cited

U.S. PATENT DOCUMENTS

| 2007/0216253 | A1 | 9/2007 | Shendi | |
|---|---|---|---|---|
| 2011/0260574 | A1* | 10/2011 | Brudny | H02K 1/06 310/254.1 |

FOREIGN PATENT DOCUMENTS

| CN | 102568703 A | 7/2012 |
|---|---|---|
| CN | 203206003 U | 9/2013 |
| CN | 203482057 U | 3/2014 |
| CN | 104953778 A | 9/2015 |
| CN | 105099016 A | 11/2015 |
| CN | 204947752 U | 1/2016 |
| CN | 205544647 U | 8/2016 |
| CN | 105978271 A | 9/2016 |
| CN | 106026447 A | 10/2016 |
| CN | 106487121 A | 3/2017 |
| WO | 2009/030779 A1 | 3/2009 |

OTHER PUBLICATIONS

The Fourth Office Action dated Dec. 27, 2019 received in Chinese Patent Application 201610939675.1, together with English language translation.
Minjie, Z., et. al., "Theory and Design of Magnetic Components in Switching Power Supply", Beijing University of Aeronautics and Astronautics Press, pp. 77-78 Jan. 31, 2014, together with an English language translation, published in China.
Examination Report dated Apr. 24, 2020 received in Indian Patent Application No. IN 201937017553 together with an English language translation.
International Search Report dated Oct. 13, 2017 issued to PCT/CN2017/099341.
First Office Action dated May 23, 2018 received in Chinese Patent Application No. CN 201610939675.1 together with an English language translation.
Second Office Action dated Feb. 2, 2019 received in Chinese Patent Application No. CN 201610939675.1 together with an English language translation.
Third Office Action dated Aug. 13, 2019 received in Chinese Patent Application No. CN 201610939675.1 together with an English language translation.
Official Action dated Sep. 23, 2020 received in European Patent Application No. EP 17 864 415.9.

* cited by examiner

STATOR FOR MOTOR, MOTOR AND COMPRESSOR

CROSS-REFERENCE TO RELATED APPLICATIONS

This is a national stage of International Application No. PCT/CN2017/099341, filed Aug. 28, 2017, claiming priority based on Chinese Patent Application No. 201610939675.1, filed Oct. 31, 2016, the entire contents of which are incorporated herein by reference. No new matter is added.

FIELD

The present disclosure relates to a technical field of compressors, and more particularly to a stator for a motor, a motor, and a compressor.

BACKGROUND

A compressor is usually provided with a motor to drive the compressor to operate, so as to compress a refrigerant.

As the energy efficiency index is upgraded constantly, it has become an increasingly important issue that the structure of the motor needs to be optimized to improve the energy efficiency of the compressor in operation, so as to realize a purpose of energy conservation. Meanwhile, with the continuous reduction of resources, such as iron, copper, and aluminum, it is desired that the motor uses as fewer materials as possible under the condition of achieving the same output power.

SUMMARY

The present disclosure seeks to solve at least one of the problems existing in the related art to at least some extent. Therefore, the present disclosure provides a stator for a motor, and when the stator is used for the motor, it is conductive to improving the output power of the motor, and hence saving materials and lowering cost under the condition of achieving the same output power compared with the motor in the related art.

The present disclosure further provides a motor including the above stator.

The present disclosure further provides a compressor including the above motor.

The stator according to embodiments of the present disclosure includes: a substantially annular stator body. The stator body is formed by stacking a plurality of silicon steel sheets. The silicon steel sheet has magnetic induction intensity of B that is greater than 1.79 T. The stator body has an inner peripheral wall formed with a plurality of stator teeth spaced apart, and two adjacent stator teeth define an accommodating groove therebetween. A circle where respective inner end surfaces of the plurality of stator teeth are located has a diameter of D1, and another circle where an outer end of the stator body 1 is located has a diameter of D2, D1 and D2 satisfying D1/D2>0.515.

For the stator according to embodiments of the present disclosure, the stator body is formed by stacking the plurality of silicon steel sheets, the magnetic induction intensity B of the silicon steel sheet is greater than 1.79 T, and the diameter D1 of the circle where the respective inner end surfaces of the plurality of stator teeth are located and the diameter D2 of the circle where the outer end of the stator body 1 is located satisfy D1/D2>0.515, such that when the stator is used for the motor, the performance of the motor can be improved and the output power of the motor can be increased, thereby saving materials and lowering cost compared with motors in the related art that achieve the same output power.

According to some embodiments of the present disclosure, the silicon steel sheet has a thickness of 0.35 mm or 0.5 mm.

According to some embodiments of the present disclosure, an orthographic projection of the accommodating groove on a cross section of the stator body has an area of S, and S satisfies $S>[0.215*(D2^2-D1^2)*3.14]/4$ mm².

According to some embodiments of the present disclosure, a width of each stator tooth is called stator tooth width, and a center distance between inner ends of two adjacent accommodating grooves is called stator tooth pitch. The stator tooth width is bt1, the stator tooth pitch is t1, and bt1 and t1 satisfy bt1/t1<0.48.

According to some embodiments of the present disclosure, the silicon steel sheet is processed by cold rolling.

According to some embodiments of the present disclosure, each stator tooth has an inner end provided with a limiting portion, and the limiting portion is configured to limit a position of a coil block of the motor.

The motor according to embodiments of the present disclosure includes the above stator; and a coil block configured to be wound around the stator tooth and accommodated in the accommodating groove.

For the motor according to embodiments of the present disclosure, by providing the above stator, the performance of the motor can be improved, and the output power of the motor can be increased, thereby saving materials and lowering cost compared with motors in the related art that achieve the same output power.

According to some embodiments of the present disclosure, a power cord of the coil block is configured as a polyamide-imide composite polyester imide enamelled copper wire, a polyamide-imide composite polyester imide enamelled aluminum wire, a polyester enamelled copper wire, a polyester enamelled aluminum wire, or a copper-clad aluminum wire.

The compressor according to embodiments of the present disclosure includes the above motor.

For the compressor according to embodiments of the present disclosure, the energy efficiency of the compressor can be improved by providing the above motor.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
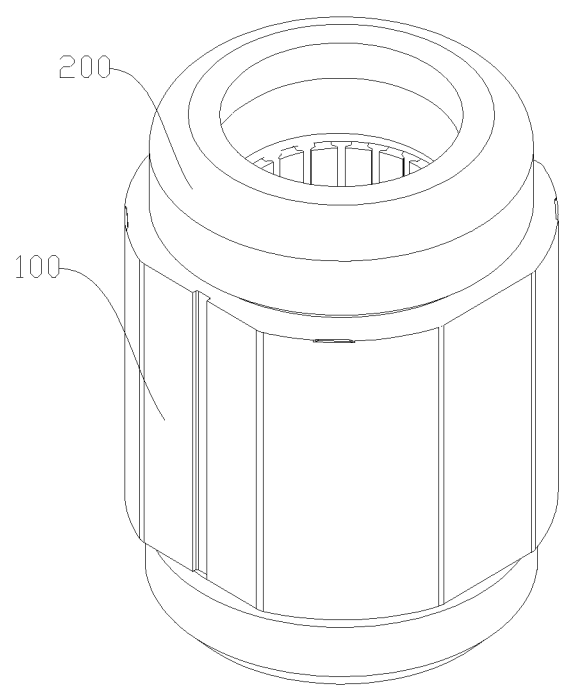
FIG. 1 illustrates a partially schematic view of a motor according to some embodiments of the present disclosure.

REFERENCE NUMERALS stator 100, stator body 1, stator tooth 2, limiting portion 21, accommodating groove 3, coil block 200.

DETAILED DESCRIPTION

Embodiments of the present disclosure will be described in detail and examples of the embodiments will be illustrated in the drawings. The embodiments described herein with reference to drawings are explanatory, which are merely used to illustrate the present disclosure, but shall not be construed to limit the present disclosure.

In the specification, it is to be understood that terms such as "central," "upper," "lower," "inner," "outer," "axial," and "circumferential" should be construed to refer to the orientation or position relationship as then described or as shown in the drawings under discussion. These relative terms are for convenience and simplification of description, and do not indicate or imply that the present disclosure must have a particular orientation or be constructed and operated in a particular orientation. Thus, these relative terms should not be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the term "a plurality of" means at least two, for example, two, three or etc., unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical connection, electrical connections, or mutual communication; may also be direct connections or indirect connections via intervening structures; may also be inner communications or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A stator 100 according to embodiments of the present disclosure will be described with reference to FIGS. 1-3. The stator 100 can be used for a motor.

Figure 2:
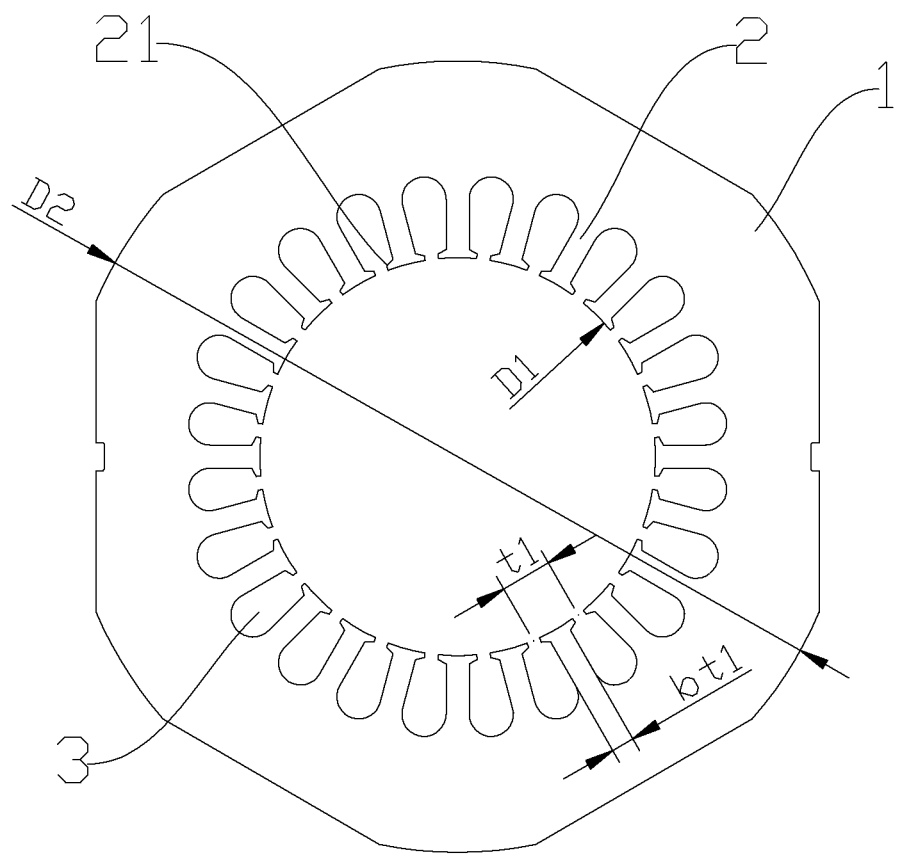
FIG. 2 illustrates a top view of a stator according to some embodiments of the present disclosure.
Figure 3:
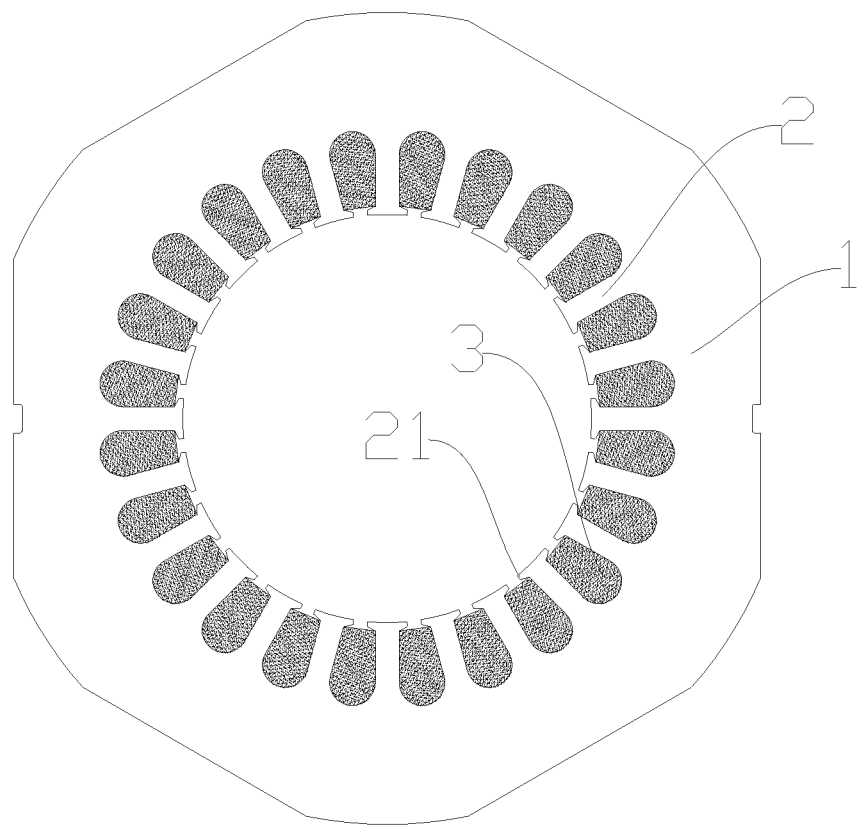
FIG. 3 illustrates a top view of a stator according to some embodiments of the present disclosure, in which a shaded part represents an area of an accommodating groove.

As illustrated in FIGS. 2 and 3, the stator 100 according to embodiments of the present disclosure can include a substantially annular stator body 1.

The stator body 1 is formed by stacking a plurality of silicon steel sheets. For example, the plurality of substantially annular silicon steel sheets are sequentially stacked in an up and down direction to form the stator body 1. It could be understood that the up and down direction herein refers to an axial direction of the stator body 1.

The silicon steel sheet has magnetic induction intensity of B that is greater than 1.79 T. For example, B is 1.8 T, 1.82 T, 1.85 T, 1.87 T, or etc. Thus, when the stator 100 is used for the motor, the iron loss is small, which is beneficial to improving the performance of the motor and reducing the volume and weight of the stator 100, so as to save materials.

As illustrated in FIGS. 2 and 3, an inner peripheral wall of the stator body 1 is formed with a plurality of stator teeth 2 spaced apart, and two adjacent stator teeth 2 define an accommodating groove 3 therebetween. When the stator 100 is used for the motor, a coil block 200 of the motor can be wound around the stator tooth 2 and accommodated in the accommodating groove 3, thereby realizing the assembly of the motor.

As illustrated in FIG. 2, a circle where respective inner end surfaces of the plurality of stator teeth 2 are located has a diameter of D1, and another circle where an outer end of the stator body 1 is located has a diameter of D2, in which D1 and D2 satisfy D1/D2>0.515. For example, D1/D2 is 0.52, 0.53, 0.55 or etc. Thus, the structure of the stator 100 can be optimized, and the material of the stator 100 can be saved.

For the stator 100 according to embodiments of the present disclosure, the stator body 1 is formed by stacking the plurality of silicon steel sheets, the magnetic induction intensity B of the silicon steel sheet is greater than 1.79 T, and the diameter D1 of the circle where the respective inner end surfaces of the plurality of stator teeth 2 are located and the diameter D2 of the circle where the outer end of the stator body 1 is located satisfy D1/D2>0.515, such that when the stator 100 is used for the motor, the performance of the motor can be improved and the output power of the motor can be increased, thereby saving materials and lowering cost compared with motors in the related art that achieve the same output power.

Optionally, the silicon steel sheet has a thickness of 0.35 mm or 0.5 mm. Thus, the structure of the stator body 1 can be further optimized.

According to some embodiments of the present disclosure, the orthographic projections of the accommodating grooves 3 on a cross section of the stator body 1 have an area of S, and S satisfies $S>[0.215*(D2^2-D1^2)*3.14]/4$ mm$^2$. That is, the sum of the areas of the orthographic projections of all the accommodating grooves 3 on the cross section of the stator body 1 is S, and S satisfies $S>[0.215*(D2^2-D1^2)*3.14]/4$ mm$^2$. Thus, the structure of the stator body 1 can be further optimized.

Optionally, as illustrated in FIG. 2, a width of each stator tooth 2 is called the stator tooth width, and a center distance between inner ends of two adjacent accommodating grooves 3 is called the stator tooth pitch. The stator tooth width is bt1, the stator tooth pitch is t1, and bt1 and t1 satisfy bt1/t1<0.48. For example, bt1/t1 is 0.41, 0.43, 0.45, 0.46 or 0.47. Thus, the structure of the stator body 1 can be further optimized.

Optionally, the silicon steel sheet is processed by cold rolling, which is simple and convenient, thereby enhancing the processing efficiency.

According to some embodiments of the present disclosure, as illustrated in FIGS. 2 and 3, an inner end of each stator tooth 2 is provided with a limiting portion 21 configured to limit the position of the coil block 200 of the motor. Thus, when the coil block 200 is wound around the stator tooth 2, by providing the inner end (i.e., an end close to the center of a circle of the stator body 1) of the stator tooth 2 with the limiting portion 21, the coil block 200 can be reliably positioned on the stator tooth 2, thereby ensuring the reliability during the operation of the motor.

The structure of the stator 100 according to a specific embodiment will be described in detail with reference to FIGS. 2-3.

As illustrated in FIGS. 2 and 3, the stator 100 according to this embodiment includes a substantially annular stator body 1.

The stator body 1 is formed by stacking a plurality of silicon steel sheets, and the silicon steel sheet has magnetic induction intensity of B that is equal to 1.8 T. The silicon steel sheet has a thickness of 0.5 mm. An inner peripheral wall of the stator body 1 is formed with a plurality of stator teeth 2 spaced apart, and two adjacent stator teeth 2 define an accommodating groove 3 therebetween. When the stator 100 is used for the motor, a coil block 200 of the motor can be wound around the stator tooth 2 and accommodated in the accommodating groove 3, thereby realizing the assembly of the motor.

As illustrated in FIG. 2, a circle where respective inner end surfaces of the plurality of stator teeth 2 are located has a diameter of D1, and another circle where an outer end of the stator body 1 is located has a diameter of D2, in which D1=52 mm, D2=100 mm, and D1/D2=0.52.

The orthographic projections of the accommodating grooves 3 on the cross section of the stator body 1 have an area of S, in which $S=[0.215*(D2^2-D1^2)*3.14]/4=1231$ mm$^2$. The number of the accommodating grooves 3 is 24, such that the stator tooth pitch $t1=3.14*52/24=6.8$ mm, the stator tooth width bt1 is 3.15 mm, and bt1/t1=0.46.

As shown in the table below, the efficiency of the motor varies with torque at constant current, resistance and voltage and under different loads, in which the efficiency of the motor is the ratio of output efficiency to input efficiency.

| Torque (N · m) | 1.2 | 1.4 | 1.6 | 1.8 | 1.9 | 2.0 | 2.1 | 2.2 | 2.4 | 2.6 | 2.8 |
|---|---|---|---|---|---|---|---|---|---|---|---|
| Efficiency of motor in the related art (%) | 74.1 | 77.2 | 79.2 | 80.7 | 81.3 | 81.6 | 81.4 | 81.0 | 80.5 | 79.5 | 78.5 |
| Efficiency of motor in this embodiment (%) | 76 | 78.7 | 81.0 | 82.4 | 83.1 | 83.4 | 83.6 | 83.7 | 83.1 | 82.4 | 81.0 |

It can be concluded from the above table that the use of the motor in this embodiment is advantageous to improving the efficiency of the motor and enhancing the performance of the motor.

As illustrated in FIG. 1, the motor according to embodiments of the present disclosure includes the above stator 100, and the coil block 200 that is configured to be wound around the stator tooth 2 and accommodated in the accommodating groove 3.

For the motor according to embodiments of the present disclosure, by providing the above stator 100, the performance of the motor can be improved, and the output power of the motor can be increased, thereby saving materials and lowering cost compared with motors in the related art that achieve the same output power.

Optionally, a power cord of the coil block 200 is a polyamide-imide composite polyester imide enamelled copper wire, a polyamide-imide composite polyester imide enamelled aluminum wire, a polyester enamelled copper wire, a polyester enamelled aluminum wire, or a copper-clad aluminum wire. Thus, the cost can be reduced.

A compressor according to embodiments of the present disclosure includes the above motor.

For the compressor according to embodiments of the present disclosure, by providing the above motor, the energy efficiency of the compressor can be improved.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above terms throughout this specification are not necessarily referring to the same embodiment or example of the present disclosure. Furthermore, the particular features, structures, materials, or characteristics may be combined in any suitable manner in one or more embodiments or examples. Additionally, different embodiments or examples described in the specification as well as features of the various embodiments or examples may be combined by those skilled in the art without any contradiction.

Although embodiments have been shown and described, it would be appreciated by those skilled in the art that the above embodiments are explanatory, and any changes, modifications, alternatives, and variants can be made in the embodiments within the scope of the present disclosure.

What is claimed is:

1. A stator for a motor, comprising:
   a stator body comprising:
      an elongated wall extending along an axis, wherein the elongated wall has an inner surface and an outer surface to define a substantially annular shape of the stator body, and
      a plurality of stator teeth formed on the inner surface of the elongated wall, wherein the plurality of stator teeth are circumferentially spaced from one another, such that an accommodating groove is defined circumferentially between every two adjacent stator teeth, wherein a total number of 24 accommodating grooves are defined by the plurality of stator teeth;
   wherein each stator teeth has an inner end surface and the inner end surfaces of the plurality of stator teeth collectively define a first imaginary circle in a plane substantially perpendicular to the axis, wherein the first imaginary circle has a first diameter D1, wherein the first diameter is 52 mm;
   wherein the outer surface of the elongated wall defines a second imaginary circle in the plane, wherein the second imaginary circle has a second diameter D2, wherein the second diameter is 100 mm;
   wherein the accommodating grooves formed by the plurality of stator teeth collectively define a projected area S on the plane, and the projected area S satisfies $S=(0.215*(D2^2-D1^2)*3.14)/4$ mm$^2$=1231 mm$^2$;
   wherein each stator tooth has a width bt1 and the width bt1 is 3.15 mm, and every two adjacent accommodating grooves define a pitch t1 between the two adjacent accommodating grooves and the pitch t1 is 6.8 mm, and wherein the width bt1 and the pitch t1 satisfy bt1/t1<0.48; and
   wherein the stator body comprises a plurality of silicon steel sheets stacked to form the stator body, wherein each silicon steel sheet has a magnetic induction intensity of 1.8 T, wherein each silicon steel sheet has a thickness of 0.5 mm.

2. The stator according to claim 1, wherein the plurality of silicon steel sheets are processed by cold rolling.

3. The stator according to claim 1, wherein each stator tooth comprises a limiting portion provided at an inner end of the stator tooth and configured to limit a position of a coil block mountable to the stator.

4. The stator according to claim 3, wherein the inner end surface of each stator tooth is provided by the limiting portion.

5. The stator according to claim 1, wherein the elongated wall is substantially cylindrical and the inner surface and the outer surface of the cylindrical wall are substantially parallel to the axis.

6. A motor, comprising:
a stator according to claim 1; and
a coil block configured to be wound around the plurality of stator teeth and accommodated in the accommodating grooves.

7. The motor according to claim 6, wherein a power cord of the coil block is selected from a group consisting of a polyamide-imide composite polyester imide enamelled copper wire, a polyamide-imide composite polyester imide enamelled aluminum wire, a polyester enamelled copper wire, a polyester enamelled aluminum wire, and a copper-clad aluminum wire.

8. A compressor, comprising a motor according to claim 6.

* * * * *